United States Patent
Fridman et al.

(10) Patent No.: US 10,412,102 B1
(45) Date of Patent: Sep. 10, 2019

(54) CLOUD BASED DATA LOSS PREVENTION SYSTEM USING GRAPHICAL PROCESSING UNITS FOR INDEX FILTERING

(71) Applicant: Skyhigh Networks, Inc., Campbell, CA (US)

(72) Inventors: Vitali Fridman, Redwood City, CA (US); Sekhar Sarukkai, Cupertino, CA (US); Snehal Chennuru, Sunnyvale, CA (US)

(73) Assignee: Skyhigh Networks, LLC, Campbell, CA (US)

( * ) Notice: Subject to any disclaimer, the term of this patent is extended or adjusted under 35 U.S.C. 154(b) by 268 days.

(21) Appl. No.: 15/372,643

(22) Filed: Dec. 8, 2016

Related U.S. Application Data

(60) Provisional application No. 62/268,821, filed on Dec. 17, 2015.

(51) Int. Cl.
*H04L 29/06* (2006.01)
*G06F 21/62* (2013.01)
*G06F 16/901* (2019.01)

(52) U.S. Cl.
CPC ........ *H04L 63/1416* (2013.01); *G06F 16/901* (2019.01); *G06F 21/6227* (2013.01)

(58) Field of Classification Search
CPC .................................................. H04L 63/1416
USPC .......................................................... 726/22
See application file for complete search history.

(56) References Cited

U.S. PATENT DOCUMENTS

| | | | |
|---|---|---|---|
| 7,673,344 B1 | 3/2010 | Rowney | |
| 8,312,553 B2 | 11/2012 | Rowney | |
| 9,258,122 B1* | 2/2016 | Zhang | H04L 9/14 |
| 2006/0184690 A1* | 8/2006 | Milliken | H04L 63/1466 |
| | | | 709/238 |
| 2010/0287171 A1* | 11/2010 | Schneider | G06F 16/9014 |
| | | | 707/759 |
| 2012/0072656 A1* | 3/2012 | Archak | G06F 17/30132 |
| | | | 711/104 |
| 2015/0067810 A1* | 3/2015 | Ahuja | H04L 63/0853 |
| | | | 726/9 |
| 2015/0163206 A1* | 6/2015 | McCarthy | G06F 21/6227 |
| | | | 713/171 |

OTHER PUBLICATIONS

Krishna Narayanaswamy. Introducing Netskope Acive Cloud DLF 2.0 (https://www.netskope.com/blog/introducing-netskope-active-cloud-dlp-2-0/). Oct. 1, 2015.

\* cited by examiner

*Primary Examiner* — Khalil Naghdali
(74) *Attorney, Agent, or Firm* — Byrne Poh LLP

(57) ABSTRACT

A system for providing data loss prevention services includes an indexer system configured to generate a search index based on structured data to be protected and a detection system configured to receive the search index and network data content and to detect in the network data content for matching data based on the search index. The detection system includes a first processor and multiple graphical processing units. The first processor provides words from the network data content in parallel to each of the graphical processing units, each graphical processing unit receiving a different word from the network data content. The graphical processing units perform detection of the words in parallel to detect for matched data content in at least a portion of the search index.

6 Claims, 8 Drawing Sheets

Data to be Protected — 60

| First Name | Last Name | Social Security Number | Credit Card Number | Birthdate |
|---|---|---|---|---|
| John | Smith | 134-67-9375 | 8375 2786 4785 2685 | 1970-04-25 |
| Mary | Williams | 602-12-2835 | 2758 2786 9865 0946 | 1990-11-08 |
| ... | ... | ... | ... | ... |

Pre-Index — 65

| CKEKH KDIS | DKISK DKIS | PAV KAQI MXND | ZMD SIE CEW | TEKC |
|---|---|---|---|---|
| 18309 | 585O2 | 93A480B6 | 293920145 | 9983237 |
| 60382 | 11974 | 87B9CE24 | 586589213 | 2364674 |
| ... | ... | ... | ... | ... |

FIG. 3

CLOUD BASED DATA LOSS PREVENTION SYSTEM USING GRAPHICAL PROCESSING UNITS FOR INDEX FILTERING

CROSS REFERENCE TO OTHER APPLICATIONS

This application claims priority to U.S. Provisional Patent Application No. 62/268,821, entitled CLOUD BASED DATA LOSS PREVENTION SYSTEM USING GRAPHICAL PROCESSING UNITS FOR INDEX FILTERING, filed Dec. 17, 2015, which is incorporated herein by reference for all purposes.

BACKGROUND OF THE INVENTION

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

With the proliferation of cloud-based services, in particular, cloud-based storage services, and the increased usage of mobile devices, enterprises are finding it difficult to determine if sensitive data is being sent out of the enterprise's premises. Data loss prevention (DLP) has become an important issue for enterprises using cloud-based services. Existing solutions for data loss prevention includes deploying on-premises DLP systems to monitor outgoing network traffic and to scan computers in the enterprise to ensure policy compliance. However, existing data loss prevention solutions do not have the capability to monitor the usage of cloud services as the data flow to these services are encrypted and the cloud usage could be carried out in a public network using mobile devices, outside of the enterprise's control. Furthermore, existing data loss prevention solutions do not work well for use in a multi-tenant cloud storage environment.

BRIEF DESCRIPTION OF THE DRAWINGS

Various embodiments of the invention are disclosed in the following detailed description and the accompanying drawings.

FIG. 3 illustrates an example database of an enterprise containing structured data to be protected in table form.

DETAILED DESCRIPTION

Figure 1:
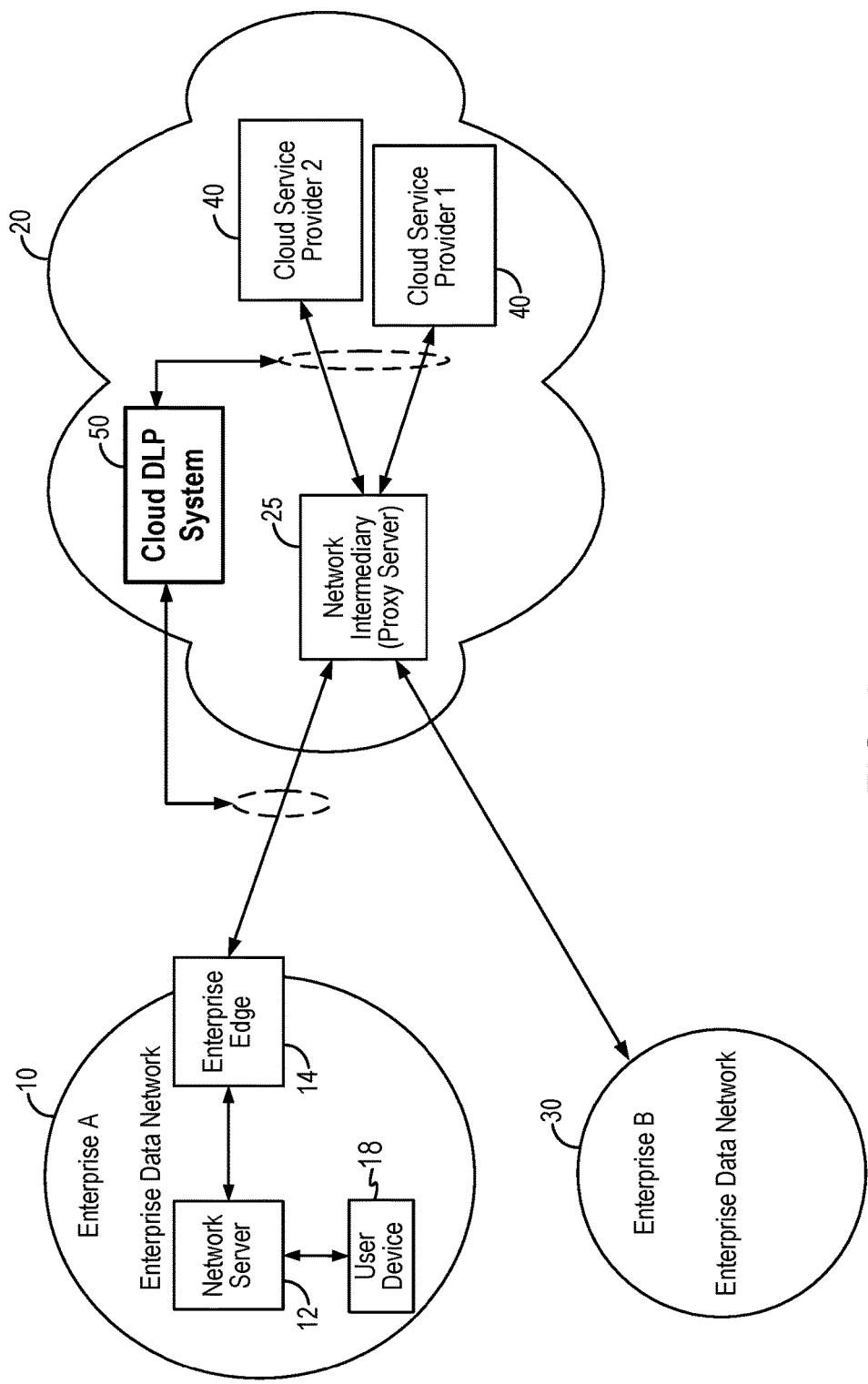
FIG. 1 is a diagram illustrating an environment in which the cloud DLP system of the present invention can be deployed in some embodiments.

The invention can be implemented in numerous ways, including as a process; a hardware processor; an apparatus; a system; a composition of matter; a computer program product embodied on a computer readable storage medium; and/or a processor or a hardware processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a cloud based data loss prevention (DLP) system ("cloud DLP system") implements a split computing architecture using separate indexer system and detection system to perform indexing and data loss prevention monitoring. The cloud DLP system is adapted for structured data or tabular data, such as data that are organized in tables. The cloud DLP system is applied to detect data loss in network data content belonging to an enterprise in accordance with the enterprise's policy and control. The network data content may be stored on one or more cloud service providers. The network content may originate from the enterprise data network or may traverse a public data network outside of the enterprise data network. In this manner, the cloud DLP system of the present invention provides the enterprise with visibility into possible violation of enterprise's data security policy.

In embodiments of the present invention, the cloud based DLP system develops a search index of data to be protected. The data to be protected are structured data organized in tables. In some examples, data records are arranged in rows so that data belonging to the same data record are stored in different fields (columns) along the same row. Examples of data to be protected are sensitive data belonging to an enterprise, such as a customer list or a user list. For example, sensitive data of an enterprise may include tables containing first name, last name, social security number, credit card number and birthdates of the enterprise's customers or users. The enterprise employs the cloud based DLP system of the present invention to perform inspection of the enterprise's network data content using the search index to prevent the enterprise's sensitive data to be accessed in a manner in violation of the enterprise's security policy. The network data content can include network data traffic traveling to and from the enterprise data network. The network data content can also travel outside of the enterprise data network between user devices and cloud service providers. Alternately, the network data content being examined includes data of the enterprise being stored on a cloud service provider.

In embodiments of the present invention, the cloud based DLP system is implemented by storing the search index of sensitive data in a remote storage device or remote storage system outside of the enterprise's data network or outside of the enterprise's control and management. In some embodiments, the cloud based DLP system is implemented by storing the search index of sensitive data in a multi-tenant cloud storage service or a hosted computing environment. Because the amount of data to be protected is often large, the search index is often of very large size, such as 30 GB or 50 GB of data. The cloud based DLP system of the present invention exploits the large storage capacity of multi-tenant cloud storage services or hosted computing services to provide efficient storage of the search index. However, the use of public multi-tenanted cloud storage to store the search index requires security measures to be taken to ensure the search index is safeguarded from unauthorized access. The cloud based DLP system of the present invention implements security measures to enable the use of public cloud-based storage services for storing the search index while ensuring protection of the enterprise's data.

In some embodiments, the cloud DLP system is an off-premises system of the enterprise and performs indexing and detection independent of the network traffic of the enterprise. Thus, the day-to-day activities of the enterprise are not interrupted. Rather, the cloud DLP system runs in the background and performs inspection and detection of the enterprise's network data content, such as the data content stored on one or more cloud service providers, against the indexed data to ensure compliance with the enterprise's control policy. In one example, the cloud DLP system is configured to scan for confidential information, as identified by the search index, that is being transmitted to or from the enterprise or being stored on a cloud service provider associated with the enterprise.

Although it is known to deploy on-premises DLP solutions to scan outgoing network traffic, the use of an off-premises cloud-based DLP system provides particular advantages. First, the cloud DLP system eliminates the need for the enterprise to maintain hardware and/or software to implement data loss prevention measures. The enterprise is relieved of the burden of maintaining on-site hardware and systems to provide data loss prevention analysis. Second, the cloud based DLP System can be configured using distributed computing systems for scalability to handle any amount of data volume.

In the present description, a "cloud-based service" or "cloud service" refers to computing resources, including hardware and software, that are delivered as a service over a data network. In most cases, the cloud service is deployed on the publicly available Internet. In embodiments of the present invention, the cloud-based service may also be deployed on a private data network of an enterprise, or be deployed on a third party private data network, or be deployed on a personal data network. Furthermore, in the present description, "cloud content" refers to data and content being stored on a cloud-based service. The cloud-based service may be a cloud storage service or other types of cloud services. The cloud content may be stored as data files, documents, or in other formats.

FIG. 1 is a diagram illustrating an environment in which the cloud DLP system of the present invention can be deployed in some embodiments. Referring to FIG. 1, an enterprise, such as an Enterprise A, may operate an enterprise data network 10 including one or more network servers 12. The enterprise data network 10 includes an enterprise network edge 14, such as a proxy server, which is used to communicate with a public data network 20, such as the publicly accessible Internet. The enterprise or users of the enterprise data network 10 may wish to use one or more cloud services provided by cloud service providers 40, such as cloud service provider 1 and cloud service provider 2. The cloud-based service may be a cloud storage service, customer relationship management (CRM) services, information technology (IT) services or other types of cloud services. Network traffic form the network server 12 travels to the enterprise network edge 14 and then onto the cloud service providers 40. Network traffic from the cloud service providers 40 are received at the enterprise network edge 14 and then transmitted onto the network server 12 to be distributed to the user device 18. In some examples, the cloud service is a multi-tenant cloud service. In that case, another enterprise, such as an Enterprise B, operating on an enterprise data network 30, may also use the cloud services provided by cloud service providers 40.

To ensure security associated with the use of one or more cloud based services, the enterprise may redirect some or all network traffic destined for one or more cloud service providers through a network intermediary 25, which can be implemented as a network proxy server. In the present description, a proxy server refers to a server, which can be a computer system or a software application, that acts as an intermediary for requests from clients seeking resources from other servers. The network intermediary 25 may be configured as reverse/forward proxies. In operation, requests and data from the user device are intercepted by the network intermediary 25 before reaching the cloud service providers 40. The network intermediary 25 may perform network traffic monitoring or encryption on behalf of the enterprise. In one embodiment, the network intermediary 25 is a cloud-based service and may be deployed on the publicly accessible Internet, such as public data network 20. In other embodiments, the network intermediary 25 may be deployed on a private data network of an enterprise, or be deployed on a third party private data network. In the example shown in FIG. 1, both Enterprise A and Enterprise B have their network traffic re-directed through the network intermediary 25 before reaching the cloud service providers 40. In the present example, the network intermediary 25 is used to intercept network traffic between an enterprise and cloud service providers. The use of network intermediary 25 is optional and is not critical to the practice of the present invention. In some cases, users of the enterprise may use user devices to access the services provided by the cloud service providers directly, without going through the network intermediary 25.

To implement data loss prevention measures, the enterprise may employ the cloud based data loss prevention system 50 ("cloud DLP system") of the present invention to generate a search index of data to be protected and to inspect the enterprise's network data content for the protected data identified in the search index. The cloud DLP system 50 is a computing system deployed on a data network outside of the enterprise data network 10. In one embodiment, the cloud DLP system 50 is deployed on the public data network 20. In other embodiments, the cloud DLP system 50 may be deployed on a private data network apart from the enterprise data network 10. Accordingly, the cloud DLP system 50 is off-premises of the enterprise data network. That is, the cloud DLP system is deployed remote from the enterprise data network operated by the enterprise.

In some embodiments, the cloud DLP system 50 inspects the network traffic of the enterprise data network for data loss prevention. In other embodiments, the cloud DLP system 50 inspects the network data content of the enterprise stored on one or more cloud service providers 40, such as through the use of the API (application programming interface) of the cloud service provider. The data content of the enterprise being inspected does not have to travel through the enterprise data network.

Figure 2:
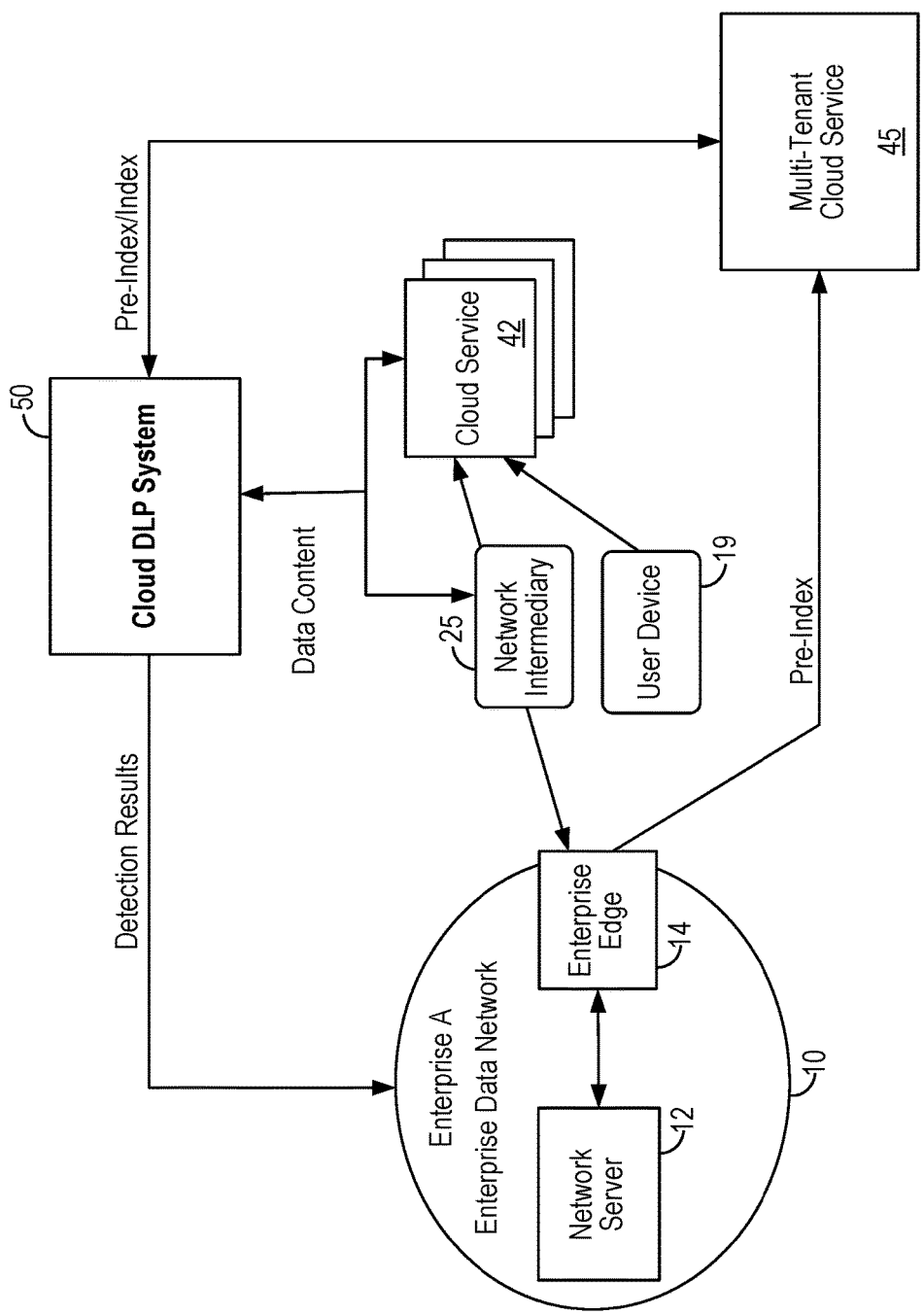
FIG. 2 is a schematic diagram illustrating the operation of the cloud DLP system in embodiments of the present invention.

FIG. 2 is a schematic diagram illustrating the operation of the cloud DLP system in embodiments of the present invention. Referring to FIG. 2, the enterprise, such as enterprise A, generates a pre-index for the data the enterprise wishes to be protected. The data to be protected is often structured data stored in a database. FIG. 3 illustrates an example database of an enterprise containing structured data to be protected in table form. Referring to FIG. 3, the enterprise may wish to protect its sensitive data in the form of a database table 60 containing first name, last name, social security number, credit card number and birthdates of the enterprise's customers or users. The fields of the database table are arranged in columns and the data records for each customer of user of the enterprise are arranged in rows. That is, each row of the database table stores data associated with each customer or user. In some examples, there may be millions of rows of data records in the database of data to be protected.

Returning to FIG. 2, the enterprise prepares or provides structured data that the enterprise wishes to be protected, such as the database table 60 of FIG. 3. The structured data are forward hashed within the enterprise data network to generate a pre-index. In one embodiment, the structured data is forward hashed using a forward hash function and using a key that is controlled by the enterprise. In some embodiments, the cloud DLP system 50 includes a client side component deployed in the enterprise data network to perform data hashing of the data or database to be protected. As thus configured, within the enterprise data network 10, the client side component of the DLP system 50 applies a forward hash function to the data to be protected to generate the pre-index. More specifically, the pre-index is forward hashed within the enterprise data network using a key controlled by the enterprise. FIG. 3 illustrates an example of a pre-index 61 generated from the database table 60. In embodiments of the present invention, the pre-index has the same tabular structure as the database table 60 and contains hash values of the data to be protected where the data is forward hashed using the forward hash function and based on an enterprise-controlled key. More specifically, in the pre-index 61, the data value in each data field of each data record has been forward hashed into a hash value that conceals the underlying clear-text data value.

Returning to FIG. 2, the pre-index thus generated is transmitted to be stored on a remote storage system, that is, a storage system outside of the enterprise data network 10. In the present embodiment, the pre-index is transmitted to be stored on a cloud service 45 which is a multi-tenant cloud service provider. In embodiments of the present invention, the pre-index is transmitted to the cloud service 45 without going through the network intermediary 25 as the pre-index is typically a very large file (30-50 GB). As thus configured, the use of the cloud DLP system 50 of the present invention does not require the enterprise to transmit its sensitive data out of the enterprise's data network in clear text. Instead, the enterprise's sensitive data is hashed, or is encoded, when being transmitted and when stored on the multi-tenant cloud service 45. Furthermore, in embodiments of the present invention, the pre-index is forward-hashed and therefore the encoding cannot be reversed. Additional security is provided by the use of forward hashing of the enterprise's data to be protected to generate the pre-index.

The cloud DLP system 50 performs two functions. First, the cloud DLP system 50 processes the pre-index stored on the cloud service 45 to generate a search index for the data to be protected or the database to be protected. In particular, the cloud DLP system 50 generates the search index using the hashed data values in the pre-index. Accordingly, the search index thus generated contains hashed data values of the enterprise's sensitive data. Second, with the search index thus generated, the cloud DLP system 50 performs detection of network data content of the enterprise against the search index for security policy violation. In some embodiments, the data files or network data traffic of the enterprise is forward hashed using the same forward hash function and the same key that was used to generate the pre-index. The hash values of the network data content of the enterprise is then compared against the search index to detect for matched content. Matched data content that is discovered can then be examined based on the enterprise's security policy, such as to take appropriate remediation measures.

In the embodiment shown in FIG. 2, the enterprise data network 10 uses one or more cloud services 42 in its regular course of business. Network data traffic travels from the enterprise edge 14 to the cloud services 42, either going through the network intermediary 25 as shown in FIG. 2, or without a network intermediary in other embodiments. For example, a user device 19 associated with the enterprise may communicate directly with the cloud service 42 to access or store data content belonging to the enterprise. In some embodiments, the enterprise data network 10 may use multi-tenant cloud service 45 only for storing the pre-index and does not use cloud service 45 in the regular course of business. Cloud service 45 may be used only in association with data loss prevention measures and it is not critical to the practice of the present invention that the cloud service 45 is also used by the enterprise to store data content in its normal course of business. In other embodiments, cloud service 45 is one of many cloud services, including cloud services 42, employed by the enterprise and the cloud service 45 may store data content of the enterprise as well as the pre-index and the search index of sensitive data of the enterprise.

Figure 4:
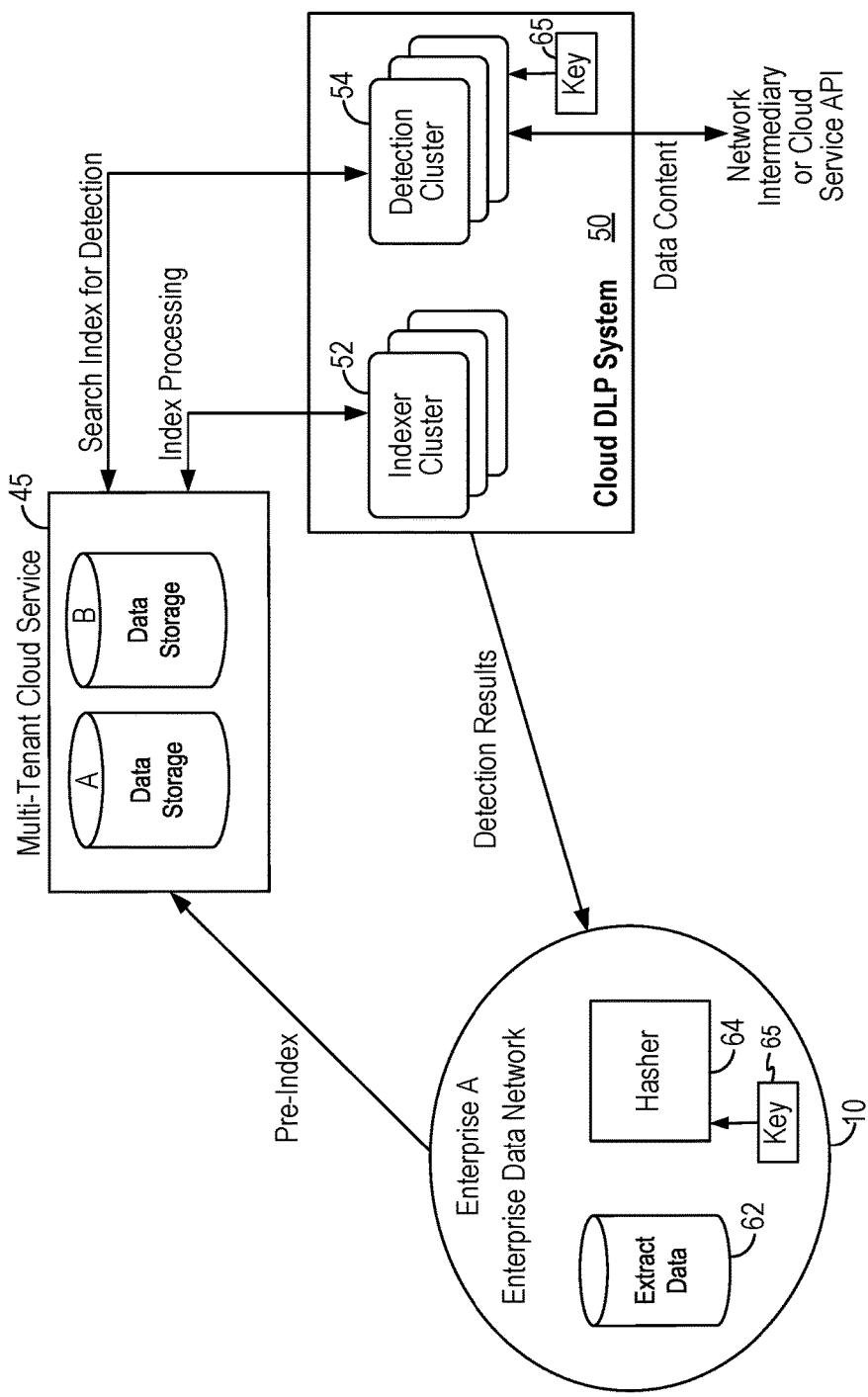
FIG. 4 is a schematic diagram illustrating the detail operation of the cloud DLP system in embodiments of the present invention.

FIG. 4 is a schematic diagram illustrating the detail operation of the cloud DLP system in embodiments of the present invention. Referring to FIG. 4, the cloud DLP system 50 implements a split computing architecture using separate indexer system and detection system to perform indexing and to perform detection against the search index, as will be explained in more detail below.

To implement data loss prevent measures using the cloud DLP system 50 of the present invention, the enterprise, such as Enterprise A, prepares a database of data to be protected. For example, a database 62 of extract data is prepared. The database 62 contains structured data, such as data in a tabular format. Because the database 62 contains sensitive data, the database 62 cannot leave the enterprise premises in clear text. Accordingly, the database 62 is forward hashed or encoded using a hasher 64 on the premises of the enterprise data network to generate a pre-index. The hasher 64 uses a key 65 belonging to or controlled by the enterprise. The hasher 64 applies a forward hash function to the database 62. In the present description, a forward hash function refers to a hash function that is practically impossible to reverse or invert. That is, a forward hash function ensures that it is practically impossible to recreate the input data from the hash value alone. Thus, with the use of the forward hash function, hasher 64 generates hashed data where it is practically impossible to re-generate the clear text data from the hashed data. In some embodiments, the hasher 64 may use a one-time random value to encode the data in database 62. In this manner, the hasher 64 generates the pre-index of hashed data values from the clear text data in the database 62. In one example, the pre-index has the same data structure as database 62, such as the tabular data format shown in FIG. 3, but with all the data in the data fields encoded. In some embodiments, the hasher 64 is a client side component of the cloud DLP system 50 which is deployed in the enterprise data network to perform data hashing of the database 62 containing data to be protected.

With the pre-index thus generated, the hasher 64 uploads the pre-index to a multi-tenant cloud service 45. In a multi-tenant cloud service, the cloud service 45 may include data storage area designated to Enterprise A to store the pre-index. The cloud service 45 may include data storage areas designated for other tenants. In embodiments of the present invention, the cloud DLP system 50 is notified when the pre-index is uploaded to the cloud service 45. In some embodiments, the cloud DLP system 50 registers a process with the cloud service 45 to obtain notification from the cloud service 45 when the pre-index is uploaded.

In embodiments of the present invention, the cloud DLP system 50 includes an indexer system 52 and a detection system 54, constructed as separate computer clusters. In the present description, a computer cluster refers to a set of connected computers that work together so that the computers can be viewed as a single system. For example, the computers in a cluster are connected to each other through a local area network and are programmed to perform the same task. In some embodiments, the indexer system 52 and the detection system 54 can be implemented using computing hardware, software, or various combinations thereof. The functionality provided by the indexer system 52 and the detection system 54 can be implemented in a variety of ways. For example, the functionality provided by the indexer system 52 and the detection system 54 can be integrated into or executed as software on a general purpose computer or a computer cluster. In some embodiments, the indexer system 52 does not include dedicated computing hardware. Instead, computing servers are activated or brought up on demand as indexing servers when indexing operation is to be performed. The indexing servers are then terminated at the completion of the indexing operation. Similarly, computing servers can be activated or brought up on demand as detection servers when detection operation is to be performed. The detection servers are then terminated at the completion of the detection operation. In this manner, significant saving of resources can be realized by not using dedicated computer hardware for the indexer system and the detection system.

In cloud DLP system 50, the indexer cluster 52 is notified when the upload of the pre-index is complete. The indexer cluster 52 downloads the pre-index from the cloud service 45 and performs processing on the pre-index data to generate a search index of the pre-index which contacts hash values of the database to be protected. In the present description, a search index refers to a data structure that improves the performance of lookup or the speed of data retrieval on a database table. Methods for indexing data in a database are known and any indexing methods can be applied to generate the search index from the pre-index of hashed data. In some embodiment, the search index thus generated is put back on the cloud service 45 to be stored. In other embodiment, the search index is stored at the cloud service 45 until it is necessary to regenerate the search index based on the pre-index. For example, the enterprise may determine the time period to generate a new pre-index or the time period to update the previous pre-index based on the data to be protected. When a new or an updated pre-index is generated, the cloud DLP system may then be notified to generate a new search index based on the updated pre-index.

With the search index thus created and stored, the detection cluster 54 can then perform inspection and detection using the search index. The detection cluster 54 pulls or downloads the search index from cloud service 45. The search index is stored in the detection cluster 54 for detection to be performed. In some embodiments, the search index is stored partly on storage disks and partly on a random-access memory to improve the efficiency of detection operation, as will be explained in more detail below.

At the cloud DLP system 50, the detection cluster 54 receives data content or data files that belong to the enterprise for examination. For example, data files or network data traffic can be provided by the network intermediary 25 which intercepts network traffic to and from the enterprise. The data files can be files being uploaded or downloaded to or from the enterprise data network. The network data traffic can include any type of data egress from or ingress to the enterprise data network. In other example, the detection cluster 54 inspects data content belonging to the enterprise that is stored on one or more cloud service providers. The cloud DLP system 50 accesses the cloud data content of the enterprise through the use of the cloud service APIs.

The cloud DLP system 50 is provided with the key 65 used by the enterprise to perform forward hashing of the database 62. The detection cluster 54, using the key 65, applies the same forward hash function to the data content to be examined. The detection cluster 54 then search the data content in the hashed data files using the search index to detect for matched content. The detection cluster 54 performs detection in accordance with the enterprise's security policy and generates detection results that are provided to the enterprise.

In some examples, in the event that matched data content in the hashed data files is found and the matched data content is deemed to be in violation of the enterprise's security policy, the detection cluster 54 may generates a warning flag or an alert in the detection result indicating potential violations. Alternately, in other examples, the detection cluster 54 may be configured to apply remediation measures, such as deleting or quarantining the data content containing the violation.

In one example, the database 62 contains the data table 60 of FIG. 3 and the search index is generated from a pre-index 61 containing hashed data of database 62. In the present example, the detection cluster 54 detects for data loss violations by using the search index to find matching data content from the hashed data content being examined that are present in 2 out of 5 columns of the data table 60, except for first and last names. For example, if the last name and the social security number of a data record are found in a data file being examined, then a violation is flagged. But if the last name and the first name of a data record are found in a data file being examined, no violation is flagged. In another example, a data file may contain a string of 9 digits. However, not any string of 9 digits is of interest and the string may not be a social security number or a social security number of interest. The detection cluster 54 compares with hashed data content with the search index. A violation is detected only if the string of digits in the network data content matches data in the search index. In the present description, it is instructive to note that the detection cluster 54 performs detection using hashed data from the data content being examined as compared against the search index which is generated from hashed data of the database to be protected. The detection cluster 54 operates only on hashed data to protect the actual sensitive data of the enterprise.

In embodiments of the present invention, a cloud DLP system implements a split computing architecture for indexing and for detection. The cloud DLP system is deployed outside of the premises of the enterprise data network or is remote from the enterprise data network. In some embodiments, the cloud DLP system receives the pre-index containing hash values of data to be protected from a multi-tenant cloud service provider. The cloud DLP system includes an indexer system to generate a search index using the hash values of the data to be protected. The cloud DLP system further includes a detection system to perform detection of data content of an enterprise using the search index. The detection system applies the same hash function to the data content to be examined. The detection system then search in the hashed data content for matched content using the search index. The cloud DLP system detects for violation of an enterprise's data security policies by detecting for data content (hashed data) that matches the data to be protected, through the use of the search index generated from hashed data of the data to be protected. In this manner, the cloud DLP system examines the enterprise's network data content for possible data loss events.

The cloud DLP system can be configured to operate with any cloud service provider used to store the pre-index or the search index. The use of any particular cloud service provider is not critical to the practice of the present invention.

According to one aspect of the present invention, the cloud DLP system includes a client side component deployed in the enterprise data network to perform data hashing of the data or database to be protected. The cloud DLP system including the indexer system and the detection system are deployed off the premises of the enterprise data network so that the heavy computational burden of the index processing is not performed within the enterprise data network. In another aspect of the present invention, the key used in the forward hash function to encode the data to be protected on the premises of the enterprise is kept separated from the pre-index. The key is not stored in the cloud service and therefore not subject to the risk of data breach.

Figure 7:
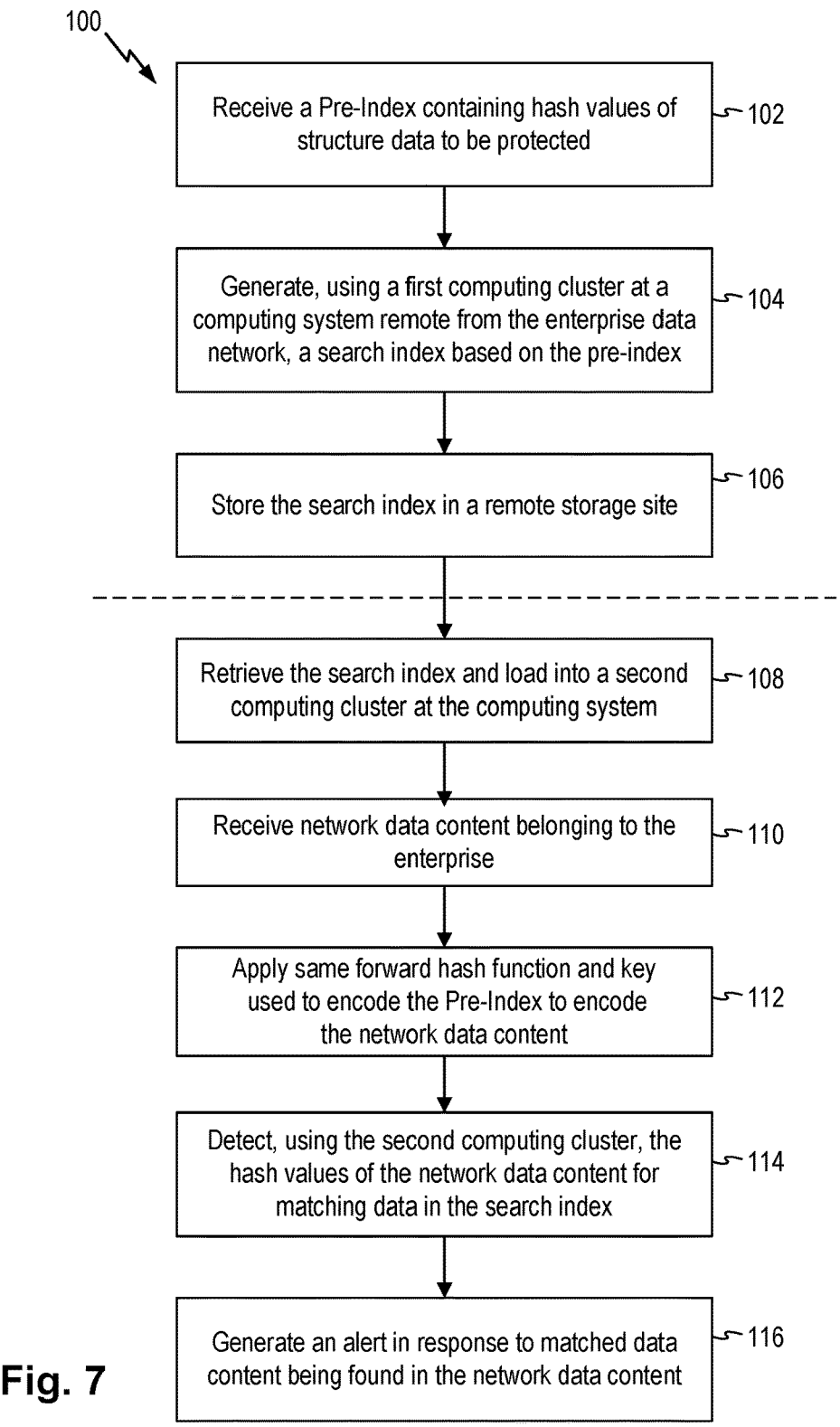
FIG. 7 is a flowchart illustrating a cloud data loss prevention method in embodiments of the present invention.

FIG. 7 is a flowchart illustrating a cloud data loss prevention method in embodiments of the present invention. Referring to FIG. 7, a cloud data loss prevention method 100 includes two parts—a first part for generating the search index and a second part for performing the content detection. The two parts do not need to be performed immediately after each other but instead can be carried out at different times.

The first part of method 100 starts by receiving a pre-index containing hash values of structured data to be protected (102). For example, the pre-index can be received from a cloud storage service, such as a multi-tenant cloud storage service. The method 100 then generates, using a first computing cluster at a computing system remote from the enterprise data network, a search index based on the pre-index (104). The method 100 then stores the search index on a remote storage site (106). For example, the search index can be stored on the multi-tenant cloud storage service used to store the pre-index.

With the search index generated, the second part of method 100 starts by retrieving the search index and loading the search index into a second computing cluster at the computing system remote from the enterprise data network (108). The method 100 then receives network data content belonging to the enterprise (110). The method 100 applies the same forward hash function and key that was used to encode the pre-index to encode the network data content (112). The method 100 then detect, using the second computing cluster, the hash values of the network data content for matching data in the search index (114). The method 100 generates an alert in response to matched data content being found in the network data content (116). In some embodiments, the method 100 may apply remediation measures based on the detection results.

Figure 8:
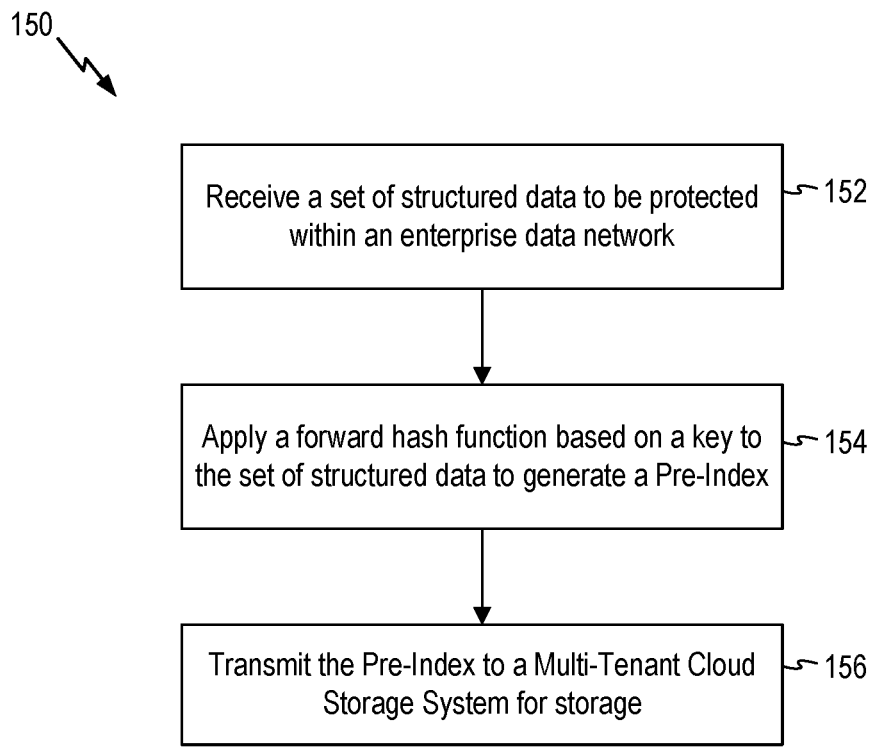
FIG. 8 is a flowchart illustrating a cloud data loss prevention method for generating the pre-index in embodiments of the present invention.

FIG. 8 is a flowchart illustrating a cloud data loss prevention method for generating the pre-index in embodiments of the present invention. In embodiments of the present invention, the enterprise's sensitive data or database to be protected will be stored at a remote storage site to alleviate the burden on the enterprise to maintain hardware and storage for the data or database. The cloud data loss prevention method therefore applies security measures to ensure the enterprise's sensitive data is protected even when stored outside of the enterprise data network. Referring to FIG. 8, the cloud data loss prevent method 150 receives a set of structured data within an enterprise data network (152). The method 150 then applies a forward hash function based on a key to the set of structured data to generate a pre-index (154). In some embodiments, the method 150 deploys a client side component within the enterprise data network to perform the hashing to generate the pre-index. The method 150 then transmits the pre-index to a multi-tenant cloud storage system remote from the enterprise data network for storage (156). In some embodiments, the method 150 uses the client side component to transmit the pre-index to the destination multi-tenant cloud storage system.

Index Filtering Using GPU

According to another aspect of the present invention, a cloud DLP system implements index filtering in the detection system to enhance the efficiency of the detection operation. In one embodiment, the index filtering is implemented using a Bloom filter. Furthermore, in some embodiments, the detection system of the cloud DLP system is constructed to use one or more graphical processing units (GPUs) to perform parallel processing of the index filtering operation so as to achieve a high detection speed.

As described above, the search index containing the data to be protected is often of very large size, such as 30 GB or 50 GB of data. During the detection operation, the search index is copied into the detection system or the detection cluster. Because of the size of the search index, the search index has to be stored on a disk drive or disk storage which renders memory access time very long and not practical for rapid inspection of large network data content of the enterprise. Furthermore, in some cases, system requirements may dictate that no significant latency is introduced due to data loss detection. Accordingly, long latency associated with the data loss detection may not be desirable.

In embodiments of the present invention, the cloud DLP system partitions the search index into a sub-index and a remainder index. The sub-index is a small portion of the search index and is stored in memory, such as a random access memory (RAM). The remainder index is of large data size and is stored on a disk storage. In one example, a search index may be 30 GB in size of which a sub-index of 300 MB is generated and is stored in RAM while the remaining of the search index is stored in a memory disk. The remainder index will have a size of 29.7 GB. In other embodiments, the entire search index may be stored in a disk storage with a sub-index portion being stored in RAM.

Furthermore, in embodiments of the present invention, the detection system implements a Bloom filter to the sub-index stored in the RAM to enhance the efficiency of the detection. In the present description, a Bloom filter refers to a data structure designed to determine, rapidly and memory-efficiently, whether an element is present in a set. A Bloom filter is a space-efficient probabilistic data structure. A Bloom filter makes a determination that an element either definitely is not in the set or may be in the set.

The detection system of the cloud DLP system performs detection of the data content by applying the data content (hash values) to the bloom filter of the sub-index implemented in the memory (RAM). The Bloom filter makes a determination if the detection system needs to look in the disk storage or not for the data content. The Bloom filter has a low false positive probability rate (e.g. 0.01). Therefore, the detection system will only be made to perform a small numbers of unneeded look up from the memory disk.

Figure 5:
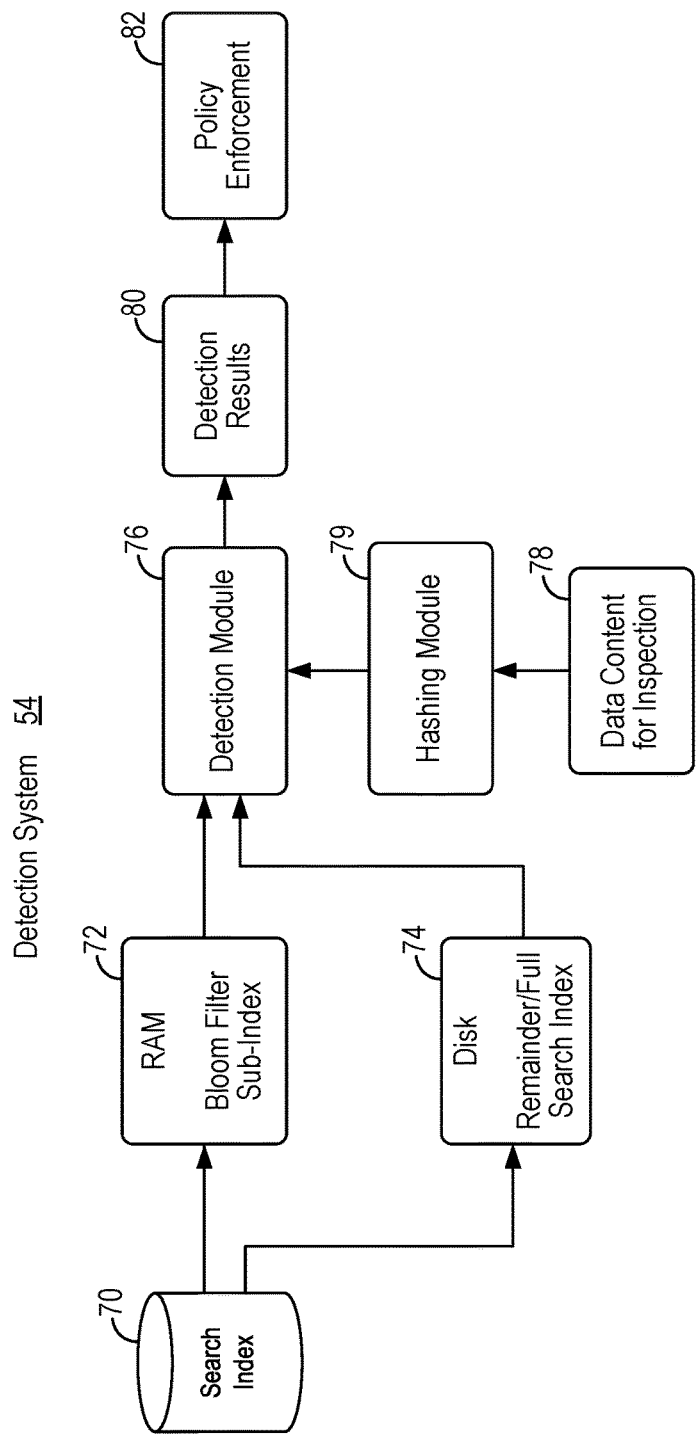
FIG. 5 is a block diagram of a detection system of the cloud DLP system in embodiments of the present invention.

FIG. 5 is a block diagram of a detection system of the cloud DLP system in embodiments of the present invention. Referring to FIG. 5, the detection system 54 downloads the search index 70 from a cloud service provider hosting the search index. For example, the search index 70 may be downloaded or retrieved from the multi-tenant cloud storage service 45 of FIGS. 2 and 4. The search index 70 is generated from a pre-index containing hash values of the data to be protected, as described above. The search index 70 is partitioned to create a sub-index. The sub-index is a small portion of the search index 70 and is stored in a memory element 72, such as a random access memory (RAM). A Bloom filter is applied to the sub-index. The remainder index, or the entire search index 70, is stored in a disk storage 74. The detection system 54 receives data content 78 for inspection. The data content 78 is hashed by hashing module 79 using the same hash function and same key that generate the pre-index. The detection system 54 includes a detection module 76 which receives the hashed data content from the hashing module 79. The detection module 76 first examines the data content (hash values) against the sub-index stored in RAM 72. Specifically, the data content (hash values) is applied to the Bloom filter implemented in RAM 72. The detection module 76 obtains a detection result of matched content or a detection result of directing the detection module to access the disk storage 74 for the remainder index or the full index. The detection module 76 generates the detection results 80. The detection results 80 are provided to the enterprise to implement policy enforcement 82.

In some embodiments, the search index 70 is partitioned or sharded into three sub-indexes: a first sub-index of common terms, a second sub-index of uncommon terms and a third sub-index of common terms on the same row. A Bloom filter is applied to each sub-index. The sub-indexes with the Bloom filters are stored in RAM 72 while the remainder index or the full index is stored on a disk storage. In operation, the detection module 76 executes search using the sub-index of the uncommon terms first which produces results indicating candidate rows. Then, the detection module 76 executes a second search using the sub-index of the common terms taking into account the candidate rows identified.

In one example, assuming the detection module receives a document containing 1 million words to be examined. The detection module takes each word in the document and check against the Bloom filter of the sub-index in RAM 72. When the Bloom filter indicates a disk look-up of the remainder index or the full index is necessary, the detection module then applies the word to the remainder index or full index in the disk look-up. When the processor of the detection module applies each word in the document to the Bloom filter in a linear fashion, the time to inspect the document is linearly proportional to the number of words in the document. In some example, for a document including 1 million words, the processor of the detection module may take up to 1.5 seconds to perform the detection. This latency may not be acceptable in some applications.

In practice, the detection module spends most of its operation time on accessing the Bloom filter in RAM 72. In some examples, the processor of the detection module spends 95% of its operation time on the Bloom filter. Bloom filter look-up is a processor intensive operation and the Bloom filter operation can become a CPU bottleneck. However, the inventors of the present invention recognize that the detection operation using Bloom filter look-up can be made into a highly parallelizable process. In embodiments of the present invention, the detection module of the detection system in the cloud DLP system is constructed using processor with massively parallel processing cores to perform the Bloom filter look up operations. In some embodiments, the detection module is constructed using one or more graphical processing units (GPUs) to perform parallel processing of the Bloom filter operation to increase the speed of detection operation. By way of explanation, in the detection operation, each word in a document can be processed in parallel. Accordingly, the Bloom filter look up operation can be performed on many words in the document in parallel. Thus, the Bloom filter look-up operation can be performed in parallel using massively parallel processing cores to dramatically reduce the detection time.

Figure 6:
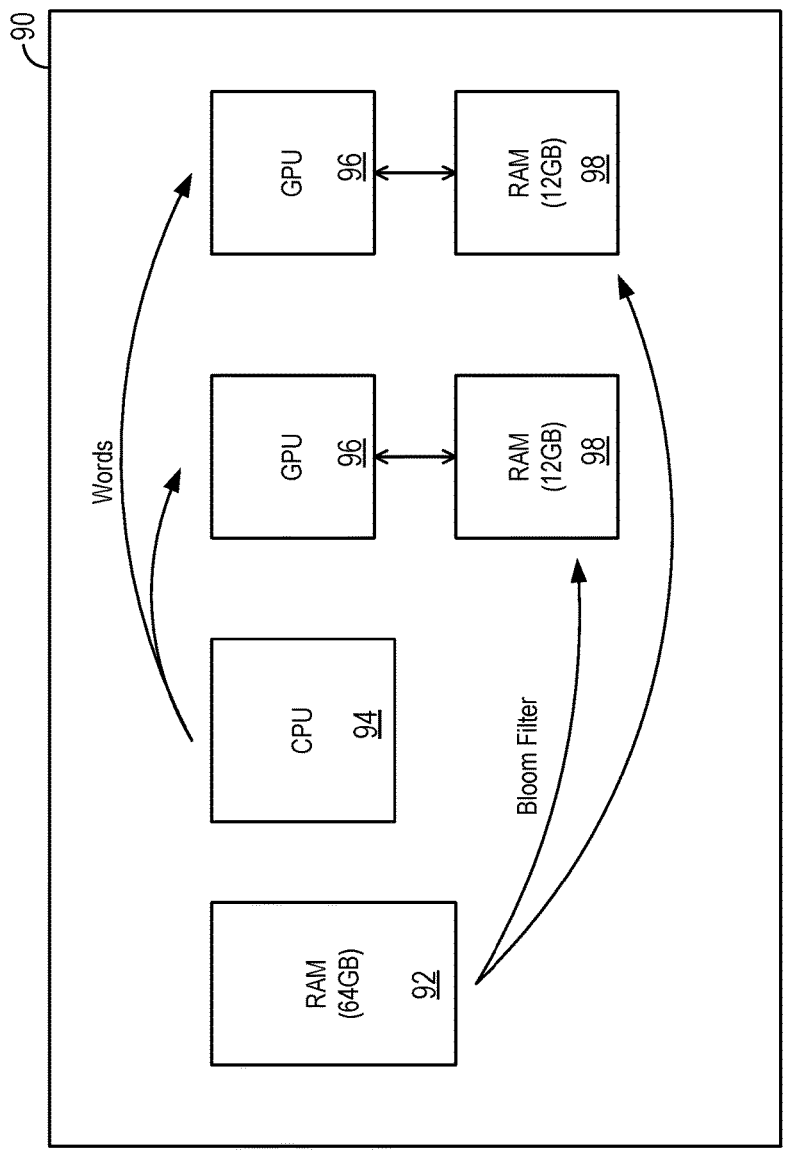
FIG. 6 is a block diagram of a detection system of the cloud DLP system in embodiments of the present invention.

FIG. 6 is a block diagram of a detection module of the cloud DLP system in embodiments of the present invention. Referring to FIG. 6, a detection module 90 is implemented using a graphical processing unit (GPU) includes a central processing unit (CPU) 94 and multiple graphical processing unit cores (GPU cores) 96. The GPU cores 96 are configured to perform parallel processing operations during the data content detection operation. More specifically, the Bloom filter look-up operation is performed in parallel using one or more graphical processing units (GPUs). A graphical processing unit is well adapted for parallel processing as each graphical processing unit includes a large number of processing cores or computation cores. A typical central processing unit (CPU) in a general purpose computer may include 8 processing or computation cores. On the other hand, a typical GPU may include 3000 or more processing cores. Thus, a GPU is well suited for massively parallel computations.

In some embodiments, a detection module is implemented using two GPUs. Accordingly, the detection module may be equipped with 6000 or more processing cores, thereby enabling massively parallel processing in the Bloom Filter look up operation for data content detection.

In some embodiments, at the beginning of a detection operation, the detection module 90 performs an on-time copy of the Bloom filter of the sub-index from a memory unit 92, such as a RAM, to the processing cores 96 of the GPU. For example, the Bloom filter is stored in a local memory unit 98, such as a RAM, associated with each GPU core 96. Then, the detection operation can start by providing the words of the document in parallel to the GPU processing cores 96, each GPU processing core 96 receiving a different word of the document. The GPU processing cores 96 process large number of words in parallel during the detection operation. As thus configured, the speed of the detection can be increased dramatically. For example, a 100× detection speed increase can be achieved.

In other aspects of the present invention, a processing module includes one or more graphical processing units to perform computations that can be massively parallelized. The large number of processing cores of a GPU can be advantageously applied to perform operations in parallel to realize large speed improvement over using conventional processors.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for providing data loss prevention services to an enterprise operating an enterprise data network, the system comprising:
  a first hardware processor and a plurality of graphical processing units, wherein the first hardware processor is configured to:
  receive, from a remote storage site, a search index based on structured data to be protected, wherein the search index is based on hash values of the structured data to be protected, wherein the structured data to be protected is encoded with a forward hash function based on a key;
  receive network data content belonging to the enterprise;
  apply the forward hash function based on the key to the network data content;
  generate a sub-index from the search index, the sub-index being a portion of the search index;
  apply a Bloom filter to the sub-index;
  detect in the network data content matching data using the Bloom filter applied to the sub-index;
  generate an alert in response to matched data being found in the network data content;
  load the sub-index into each of the plurality of graphical processing units; and
  provide hash values of words from the network data content in parallel to each of the plurality of graphical processing units, each graphical processing unit receiving a different word from the network data content, wherein each of the plurality of graphical processing units are configure to receive a hash value of a different word from the network data content, and wherein the plurality of graphical processing units are configured to perform detection of the words in parallel to detect for matched data content in the sub-index.

2. The system of claim 1, further comprising a plurality of memory units, each memory unit being coupled to a respective graphical processing unit, wherein the first processor is configured to load the sub-index into the plurality of memory units associated with the plurality of graphical processing units.

3. The system of claim 1, wherein the first hardware processor is further configured to apply remediation measures in response to matched data content being found in the network data content.

4. A method for providing data loss prevention services to an enterprise operating an enterprise data network, the method comprising:
  generating, using a hardware processor, a search index based on hash values of structured data to be protected;
  receiving, from a remote storage site, a search index based on the structured data to be protected, wherein the structured data to be protected is encoded using a forward hash function based on a key;
  receiving, at a hardware processor, network data content belonging to the enterprise;
  applying, at the hardware processor, the forward hash function based on the key to the network data content;
  generating, at the hardware processor, a sub-index from the search index, the sub-index being a portion of the search index;
  applying, at the hardware processor, a Bloom filter to the sub-index;
  loading the sub-index with the Bloom filter applied into a plurality of graphical processing units;
  providing hash values of words from the network data content in parallel to each of the plurality of graphical processing units, each graphical processing unit receiving a hash value of a different word from the network data content;
  detecting, at the plurality of graphical processing units, words in parallel for matched data content using the Bloom filter applied to the sub-index; and
  generating, at the hardware processor, an alert in response to matched data content being found in the network data content.

5. The method of claim 4, further comprising:
  detecting, at the plurality of graphical processing units, hash values of words in parallel for matched data content using the Bloom filter applied to the sub-index; and
  generating an alert in response to matched data content being found in the hash values of the network data content.

6. The method of claim 4, wherein detecting, at the plurality of graphical processing units, words in parallel for matched data content using the Bloom filter applied to the sub-index comprises detecting, using the plurality of graphical processing units, the words from the network data content in parallel for matched data content using the Bloom filter applied to the sub-index.

* * * * *